US006925047B2

(12) United States Patent  
Ives

(10) Patent No.: US 6,925,047 B2
(45) Date of Patent: Aug. 2, 2005

(54) HIGH DENSITY DATA STORAGE MODULE

(75) Inventor: Thomas Wayne Ives, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 10/109,228

(22) Filed: Mar. 28, 2002

(65) Prior Publication Data

US 2003/0185139 A1 Oct. 2, 2003

(51) Int. Cl.$^7$ ............................................. G11B 23/00
(52) U.S. Cl. ................................................. 369/258.1
(58) Field of Search ......................... 369/44.15, 44.16, 369/126, 258.1, 272.1, 287

(56) References Cited

U.S. PATENT DOCUMENTS 5,557,596 A     9/1996 Gibson et al.
5,615,143 A  *  3/1997 MacDonald et al. ........ 365/112
6,587,408 B1 *  7/2003 Jacobson et al. .......... 369/44.16

* cited by examiner

*Primary Examiner*—Paul W. Huber

(57) ABSTRACT

A data storage module for a high density data storage device. The storage module includes a planar rotor having top, bottom, left and right edges. The rotor is suspended within a frame surrounding the top, bottom, left and right edges of the rotor. The rotor is suspended by a plurality of flexures, wherein the flexures adjacent to the top edge are aligned with the top edge, the flexures adjacent to the bottom edge are aligned with the bottom edge, the flexures adjacent the left edge are aligned with the left edge, and the flexures adjacent to the right edge are aligned with the right edge.

21 Claims, 4 Drawing Sheets

HIGH DENSITY DATA STORAGE MODULE

THE FIELD OF THE INVENTION

The present invention generally relates to data storage devices, and more particularly to a storage module for use with ultra-high density data storage devices.

BACKGROUND OF THE INVENTION

It is well recognized in the field of data storage that it is desirable to increase the storage density and reduce the cost of storage in information storage devices. This is generally true for all types of information storage devices, such as magnetic hard drives, optical drives, RAM devices, and other information storage devices. However, it becomes increasingly difficult to squeeze more information into the storage devices. Moreover, conventional technologies to make those storage devices may be approaching fundamental limits on storage density.

There are many proposed alternatives to increase the storage density of storage devices. Some examples are Scanned Probe Microscopy (SPM), Atomic Force Microscopy, Scanning Tunneling Microscopy (STM), Near-Field Scanning Optical Microscopy, and Scanning Force Microscopy. Each of these proposed alternatives has its own benefits and detriments. Some are extremely expensive to build; some are difficult to implement; others have limited or poor resolution and bandwidth; still others have poor signal-to-noise ratios.

Even if one is successful in increasing the storage density, another major hurdle must still be overcome. Specifically, the time required to access the stored information must be small. Simply put, a storage device's utility is limited if it takes too long to retrieve the stored information, no matter what it's storage density. In other words, in addition to high storage density, one must find a way to quickly access the information.

In U.S. Pat. No. 5,557 596 to Gibson et al., an ultra-high density storage device which provides increased storage density while having fast access times and high data rates is described and claimed. The ultra-density storage device of Gibson et al. is based on the use of field emitters, which are made by standard semiconductor fabrication technology, and which emit beams of electrons from very sharp points. In one embodiment of Gibson et al., the storage device includes many field emitters, a storage medium and a micro mover. The storage medium has many storage areas, and the field emitters are spaced apart to have one emitter responsible for a number of storage areas on the storage medium. In one embodiment, each storage area is responsible for one bit of data on the storage device. The medium is in close proximity to the field emitters, such as a few hundredths of a micrometer to a few micrometers away.

Each field emitter generates an electron beam current. Each storage area can be in one of a few different states. In one embodiment, binary information is stored in the areas, with one state representing a high bit and another state representing a low bit. When an electron beam current bombards a storage area, a signal current is generated. The magnitude of the signal currents depends on the state of that storage area. Thus, information stored in the area can be read by measuring the magnitude of the signal current. Information can be written onto the storage areas using the electron beams. The magnitude of each electron beam can be increased to a pre-selected level to change the states of the storage area on which it impinges. By changing the state of a storage area, information is written onto it.

Like the field emitters, the micro mover is made by semiconductor micro fabrication techniques. The micro mover scans the storage medium with respect to the field emitters or vice versa. Thus, each emitter can access information from a number of storage areas on the storage medium. With hundreds or thousands of field emitters reading and/or writing information in parallel, the storage device has very fast access times and data rates.

To assure that the storage medium is accurately written to and read as it is moved by the micro movers, it is desirable for the storage medium to have complete ease of motion in the plane of the storage medium, and to have no motion in the direction normal to the plane of the storage medium. In this manner, the distance between the field emitters and the storage medium is kept constant.

Although it is desired that the storage medium move only in a single plane, achieving this result is difficult. For example, the micro mover is intended to move the storage medium solely in the plane of the storage medium (i.e., in the X-Y plane). However, depending upon the type of micro mover, there may be a tendency for the micro mover to move the storage medium out-of-plane (i.e., displace the storage medium in the Z direction). Also, environmental factors such as vibration may cause or contribute to out-of-plane movement. Restricting the out-of-plane movement of the storage medium by decreasing the out-of-plane compliance often results in a decreased in-plane compliance as well. It thus becomes a balance to suspend the storage medium in a manner which makes the ratio of in-plane to out-of-plane compliance (the "compliance ratio") as high as possible. At the same time, the space limitations of the storage device must be considered. That is, the storage medium suspension system should occupy as little space as possible and thereby increase the storage medium available for data storage. A need exists for a high density storage module which provides a suitable balance between the module's compliance ratio and its packing density.

SUMMARY OF THE INVENTION

The present invention is a data storage module for a high density data storage device. The storage module includes a rotor having top, bottom, left and right edges. The rotor is suspended within a frame surrounding the top, bottom, left and right edges of the rotor. The rotor is suspended within the frame by a plurality of flexures, wherein the flexures adjacent to the top edge are aligned with the top edge, the flexures adjacent to the bottom edge are aligned with the bottom edge, the flexures adjacent the left edge are aligned with the left edge, and the flexures adjacent to the right edge are aligned with the right edge.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
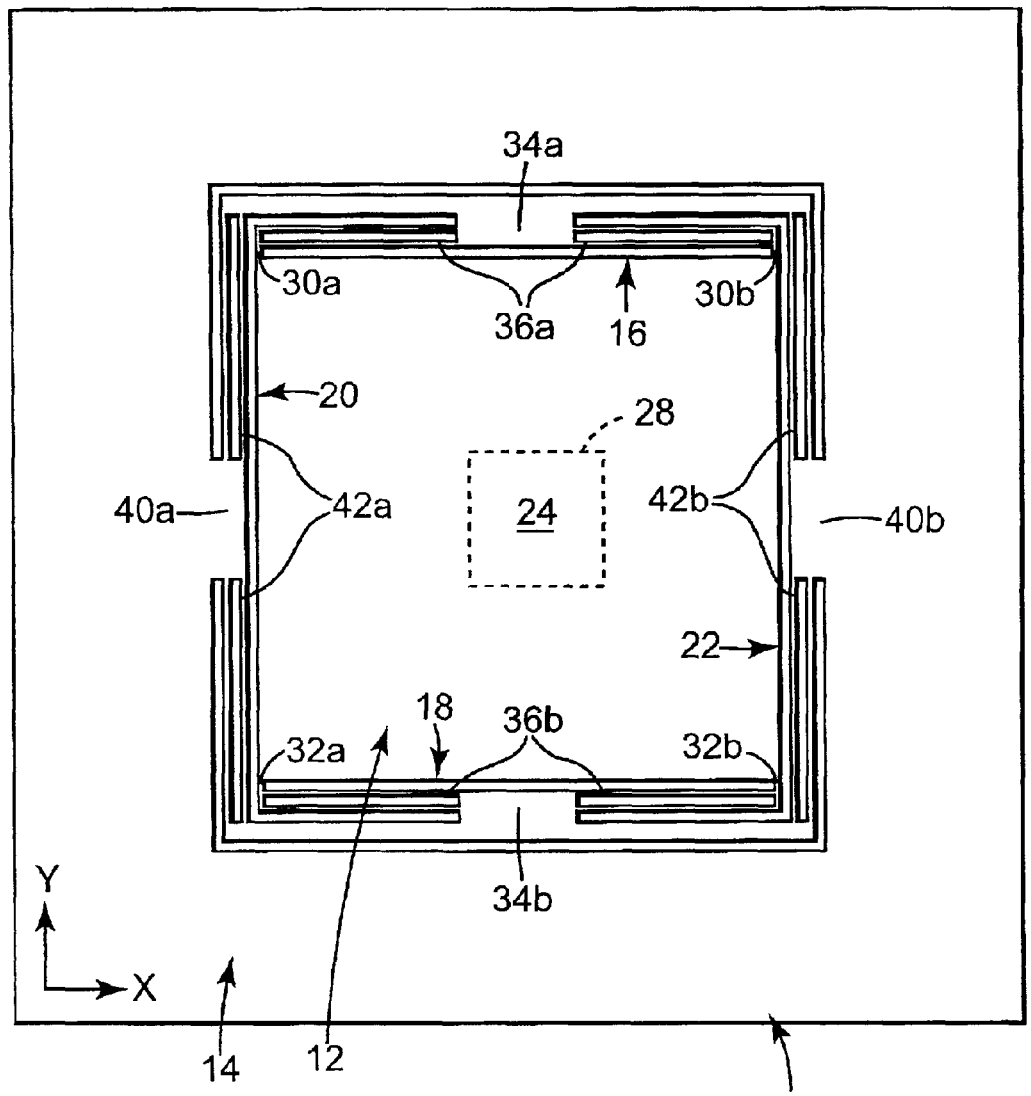
FIGS. 1a and 1b are a plan view and a perspective view, respectively, of one embodiment of the invention having a single rotor.
Figure 1B:
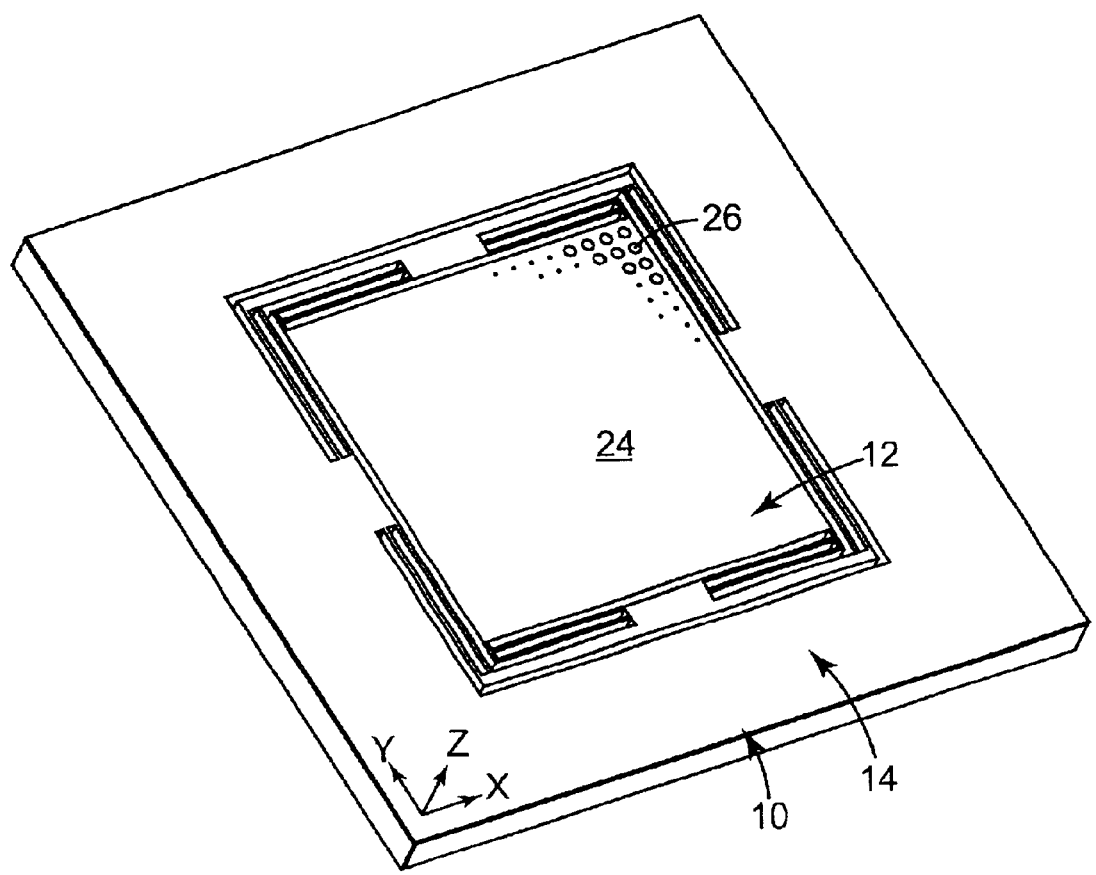

One embodiment of a high-density storage module 10 is illustrated in FIGS. 1a and 1b. Storage module 10 includes a rotor 12 and a frame 14 for supporting rotor 12. Rotor 12 is bounded by its top edge 16, bottom edge 18, left edge 20 and right edge 22. The front face 24 of rotor 12 defines an X-Y plane, with top edge 16 and bottom edge 18 aligned with the X-axis, and left edge 20 and right edge 22 aligned with the Y-axis. Front face 24 of rotor 12 is formed from a storage medium that has a plurality of storage areas 26 for data storage. The storage areas 26 (shown generically in FIG. 1b) are in one of a plurality of states to represent data stored in that area. Rotor frame 14 is spaced from rotor edges 16, 18, 20 and 22. In one embodiment, rotor frame 14 surrounds rotor 12 in the X-Y plane. Rotor 12 is moved by a micro-mover or actuator 28, which in one embodiment of the invention is located on a back face of rotor 12, opposite front face 24. A micro-mover 28 is generically illustrated in FIG. 1a. (As used herein, directional terms such as top, bottom, left, right, front and back are relative terms, and should not be construed as a limitation on the overall orientation of the storage module 10).

Rotor 12 is supported by rotor frame 14 by a plurality of support structures which interconnect rotor 12 and rotor frame 14. Many MEMS devices use beams or flexures to support masses and their systems. The beams supply both support of the systems mass and compliance for the system's mass movements. It is often desirable to have the greatest in-plane to out-of-plane compliance ratio (referred to herein as the compliance ratio) possible. However, this ratio can be limited by the chosen mechanical architecture. The reason a high compliance ratio is desirable is that the micro mover or actuator forces provided by the actuator devices used in MEMS devices are not very strong. Thus, improving in-plane compliance while maintaining, or improving, the compliance ratio is desirable. Increasing the in-plane compliance may be accomplished by allowing for axial shortening of the beams or flexures. That is, as the beams flex they tend to become shorter in the axial direction which leads to a decrease in the in-plane compliance. Compensating for this axial shortening will increase the in-plane compliance. An additional way to improve the in-plane compliance while keeping the out-of-plane compliance low and still improving the compliance ratio is to allow the ends of the beams or flexures to move angularly. Even a small angle at either or both ends of the beam can significantly increase the in-plane compliance. In many instances, the same structure may compensate for axial shortening and also allow angular movement of the beam.

Figure 2A:
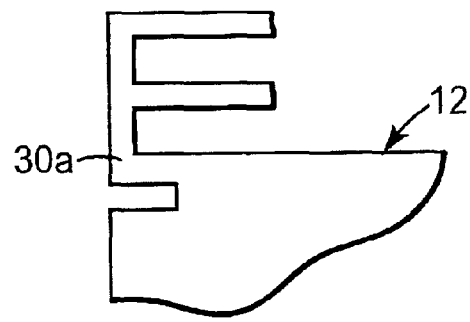
FIGS. 2a and 2b are alternate embodiments of the invention.
Figure 2B:
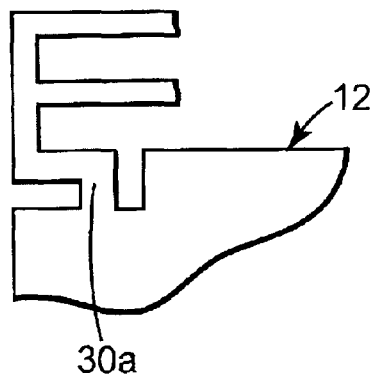

As shown in FIGS. 1a and 1b, to compensate for axial shortening and also allow angular movement of the supporting beams, a first pair of coupling beams 30a, 30b extend from top edge 16 of the rotor 12, while a second pair of coupling beams 32a, 32b extend from bottom edge 18 of rotor 12. In the embodiment shown in FIGS. 1a and 1b, rotor 12 is rectangular in shape and coupling beams 30a, 30b, 32a, 32b extend from the corners of rotor 12. Coupling beams 30a, 30b, 32a, 32b are generally aligned with the left and right edges 20, 22 of rotor 12. However, coupling beams 30a, 30b, 32a, 32b may have a different origination and orientation from that shown in FIGS. 1a and 1b. For example, the alternate embodiments shown in FIGS. 2a and 2b allow coupling beam 30a additional freedom to rotate and thereby provide additional in-plane compliance to the rotor 12.

First pair of coupling beams 30a, 30b are connected to first coupling mass 34a (positioned adjacent top edge 16 of rotor 12) by a first set of flexures 36a extending between the first pair of coupling beams 30a, 30b and first coupling mass 34a. Second pair of coupling beams 32a, 32b are connected to second coupling mass 34b (positioned adjacent bottom edge 18 of rotor 12) by a second set of flexures 36b extending between the second pair of coupling beams 32a, 32b and second coupling mass 34b. First and second sets of flexures 36a, 36b, have an axial orientation which is generally aligned with the top and bottom edges 16, 18 of rotor 12.

Rotor frame 14 includes first and second flexure mounts 40a, 40b, which are positioned on opposite sides of rotor 12 (adjacent left edge 20 and right edge 22 as shown in FIG. 1a). First and second coupling masses 34a, 34b are connected to first flexure mount 40a by flexures 42a. First and second coupling masses 34a, 34b are connected to second flexure mount 40b by flexures 42b. Flexures 42a, 42b have an axial orientation which is generally aligned with the left and right edges 20, 22 of rotor 12. Coupling masses 34a, 34b simply act as rigid bodies to translate movement between flexures 42a, 42b and flexures 36a, 36b.

It should be noted that in the embodiment shown in FIGS. 1a and 1b, the sets of flexures 36a, 36b, 42a, 42b each comprise a total of four individual flexures. However, a different number of individual flexures may be used in the sets of flexures (for example, a total of two or six flexures in each set).

In one embodiment, coupling beams 30a, 30b, 32a, 32b, and flexures 36a, 36b, 42a 42b are thin-walled micro fabricated beams. The faces of flexures 36a, 36b are in the X-Z plane; this set of flexures may be flexed in the Y direction allowing the rotor 12 to move in the Y direction with respect to the frame 14. The faces of flexures 42a, 42b are in the Y-Z direction; this set of flexures may be flexed in the X direction allowing the rotor 12 to move in the X direction with respect to the frame 14.

Figure 3:
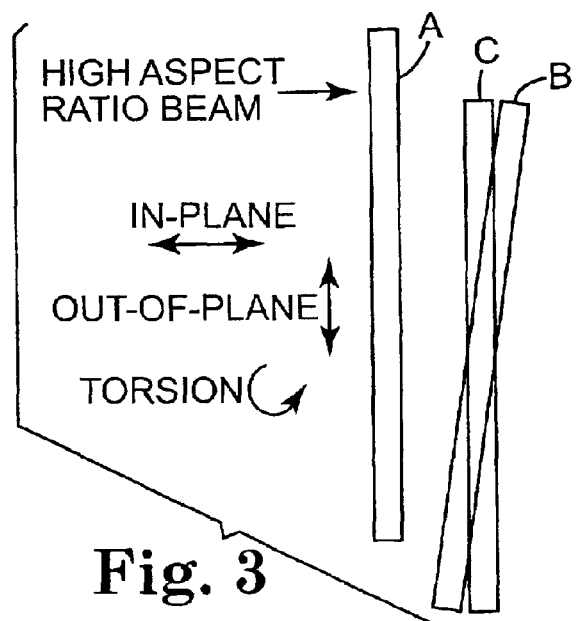
FIG. 3 is an illustration of beam movement and torsion in one embodiment of the invention.

A cross-sectional representation of one of the beam flexures is shown in FIG. 3. As the beams are flexed in-plane and out-of-plane, a torsion occurs in the beams. This torsion occurs even though the beam does not twist with respect to its axial plane. FIG. 3 shows cross-sections of a beam under no load (Position A), in-plane and out-of-plane loads (Position B), and in-plane, out-of-plane and torsion loads (Position C). Because the motion of the rotor 12 puts the beam in torsion due to the moment arms arising from displacement, the beam's tendency is to flex back from the Position C illustrated in FIG. 3 toward the Position B illustrated in FIG. 3. As noted above, it is often desirable to have the greatest in-plane to out-of-plane compliance ratio possible. However, this compliance ratio is often decreased by the beam torsions described above. In order to maintain a higher compliance ratio, it is desirable to decrease the beam's torsional and out-of-plane compliance while maximizing its in-plane compliance.

In the invention described herein, the beams torsional and out-of-plane compliance is reduced by aligning the flexures in such a way as to effectively counteract the torsions created in the flexures as the rotor 12 is displaced along the Z-axis (that is, when rotor 12 is pulled up or down by the micro mover). The greatest counteraction effect is achieved when flexures 36a, 36b are oriented to axially point at the midpoint of flexures 42a, 42b. However, counteraction of the torsions are also achieved the lesser extent when the intersection is not at the midpoint of flexures 42a, 42b. Thus, the position of the first and second set of flexures 36a, 36b, is such that the axis of the first and second set of flexures 36a, 36b, intersects the flexures 42a, 42b somewhere along the length of flexures 42a, 42b.

Figure 4:
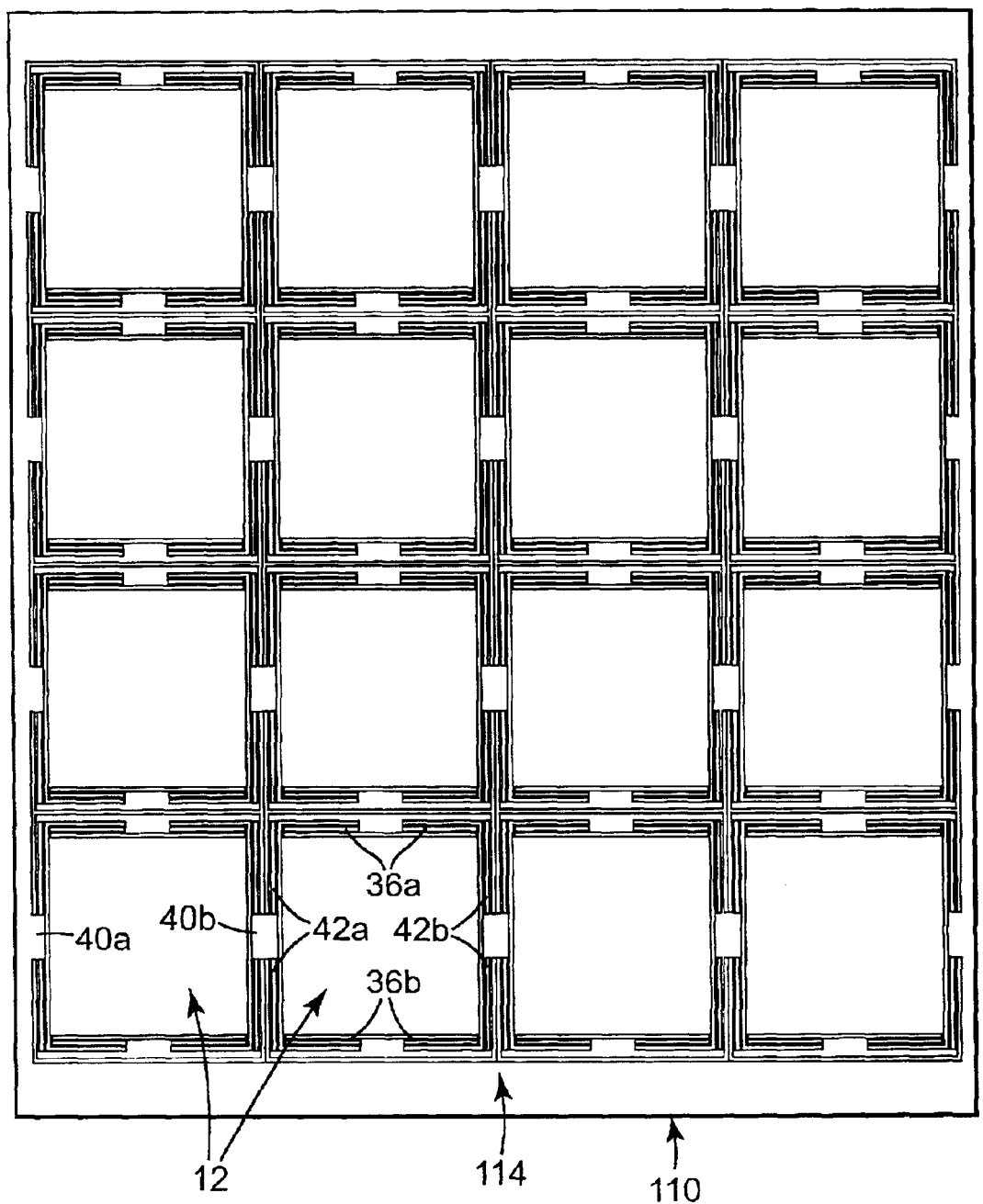
FIG. 4 is a plan view of another embodiment of the invention having a plurality of rotors.

Although the storage module 10 has been described above with respect to a single rotor 12 supported by frame 14, in practice a plurality of rotors 12 may be supported by frame 14. A storage module 110 having an array of rotors 12 is illustrated in FIG. 4. It will be noted that the orientation of flexures 36a, 36b, 42a, 42b provides a significant benefit when a plurality of rotors 12 are used in the storage module 110. Specifically, flexures 36a, 36b, 42a, 42b are arranged about the periphery of rotors 12 such that flexures 36a, 36b, 42a, 42b are each in substantially parallel alignment with the respective adjacent edges of rotors 12. Thus, the total area required for each rotor 12 and its associated suspension system is reduced and the packing density of rotors 12 within storage module 110 is correspondingly increased.

The packing density of the rotors 12 in storage module 110 may be further increased, as illustrated in FIG. 4, by eliminating the majority of the frame 114 between adjacent rotors 12. Specifically, it can be seen in FIG. 4 that the frame 114 is reduced to leave only the flexure mounts 40a, 40b of adjacent rotors 12. That is, the only portion of frame 114 between adjacent rotors is the flexure mounts 40a, 40b. The flexure mounts are mechanically secured to a motion ground, so that each rotor of the array of rotors 12 may move independently. Of course, frame 114 may also be extended so that it fully surrounds each rotor, if that is desired.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A storage module for a data storage device, the storage module comprising:
    a rotor bounded by top, bottom, left and right edges;
    a frame for supporting the rotor;
    a first pair of coupling beams extending from the top edge of the rotor;
    a second pair of coupling beams extending from the bottom edge of the rotor;
    a first coupling mass positioned adjacent the top edge of the rotor;
    a second coupling mass positioned adjacent the bottom edge of the rotor;
    a first set of flexures extending between the first pair of coupling beams and the first coupling mass;
    a second set of flexures extending between the second pair of coupling beams and the second coupling mass;
    a first flexure mount extending from the frame and positioned adjacent the left edge of the rotor;
    a second flexure mount extending from the frame and positioned adjacent the right edge of the rotor;
    a third set of flexures extending between the first flexure mount and the first and second coupling masses; and
    a fourth set of flexures extending between the second flexure mount and the first and second coupling masses.

2. The storage module of claim 1, wherein the first and second pair of coupling beams have an axial orientation which is generally aligned with the left and right edges of the rotor.

3. The storage module of claim 1, wherein the first and second set of flexures have an axial orientation which is generally aligned with the top and bottom edges of the rotor.

4. The storage module of claim 1 wherein the third and fourth set of flexures have an axial orientation which is generally aligned with the left and right edges of the rotor.

5. The storage module of claim 1, wherein the first and second set of flexures each comprise at least two individual flexures.

6. The storage module of claim 1, wherein the first and second set of flexures each comprise four individual flexures.

7. The storage module of claim 1, wherein the third and fourth set of flexures each comprise at least two individual flexures.

8. The storage module of claim 1, wherein the third and fourth set of flexures each comprise four individual flexures.

9. The storage module of claim 1, wherein the first and second coupling masses are rigid structures.

10. The storage module of claim 1, wherein the axial orientation of the first and second sets of flexures intersect the third and fourth sets of flexures.

11. The storage module of claim 1, further comprising a micro-mover interacting with the rotor to move the rotor.

12. The storage module of claim 11, wherein the micro-mover is positioned adjacent a back face of the rotor, opposite the front face of the rotor.

13. The storage module of claim 1, wherein the rotor is rectangular in shape, and wherein the coupling beams extend from each corner of the rotor.

14. The storage module of claim 1, wherein the rotor includes a storage medium.

15. The storage module of claim 14, wherein the storage medium comprises a plurality of storage areas for data storage, the storage areas each being in one of a plurality of states to represent the data stored in that area.

16. A data storage module for a data storage device, the storage module comprising:
    a rotor having top, bottom, left and right edges;
    a frame surrounding the top, bottom, left and right edges of the rotor; and
    a plurality of flexures suspending the rotor within the frame, wherein the flexures adjacent to the top edge are aligned with the top edge, the flexures adjacent to the bottom edge are aligned with the bottom edge, the flexures adjacent the left edge are aligned with the left edge, and the flexures adjacent to the right edge are aligned with the right edge.

17. The storage module of claim 16, wherein the axial orientation of the flexures adjacent to the top and bottom edges intersects the flexures adjacent to the left and right edges along their lengths.

18. The storage module of claim 16, wherein the flexures are thin-walled micro-fabricated beams.

19. A method for increasing the packing density of a plurality of storage module rotors in a frame of a storage device comprising:

supporting each of a plurality of rotors within a frame using flexures extending between edges of the rotor and the frame, wherein the flexures are positioned around the periphery of the rotor, wherein the flexures adjacent each edge of the rotor are aligned with the adjacent rotor edge.

20. The method of claim 19, wherein the flexures are thin-walled micro-fabricated beams.

21. The method of claim 19, further comprising:

aligning a first set of flexures on opposite sides of one of the plurality of rotors such that the axes of the first set of flexures intersects a second set of flexures positioned at right angles to the first set of flexures.

* * * * *